Figure 1:
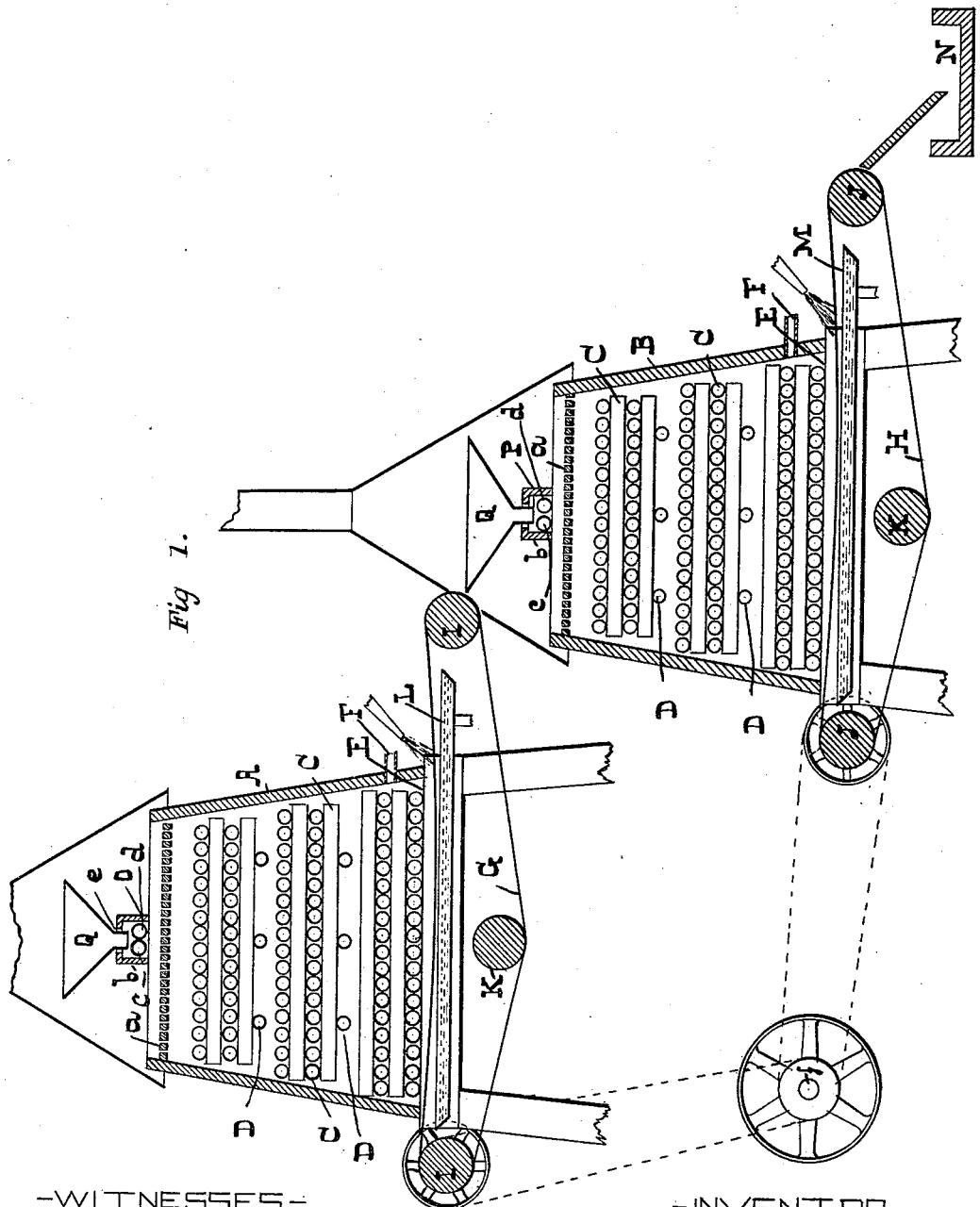

(No Model.) 2 Sheets—Sheet 1.

S. W. CRAGG.
LIXIVIATION PROCESS OF AND APPARATUS FOR THE EXTRACTION OF GOLD OR SILVER.

No. 449,814. Patented Apr. 7, 1891.

WITNESSES
Dan'l Fisher
H. C. Landis

INVENTOR
Samuel Wilkins Cragg,
by G. H. & W. T. Howard,
Attys.

(No Model.) 2 Sheets—Sheet 2.
S. W. CRAGG.
LIXIVIATION PROCESS OF AND APPARATUS FOR THE EXTRACTION OF GOLD OR SILVER.
No. 449,814. Patented Apr. 7, 1891.
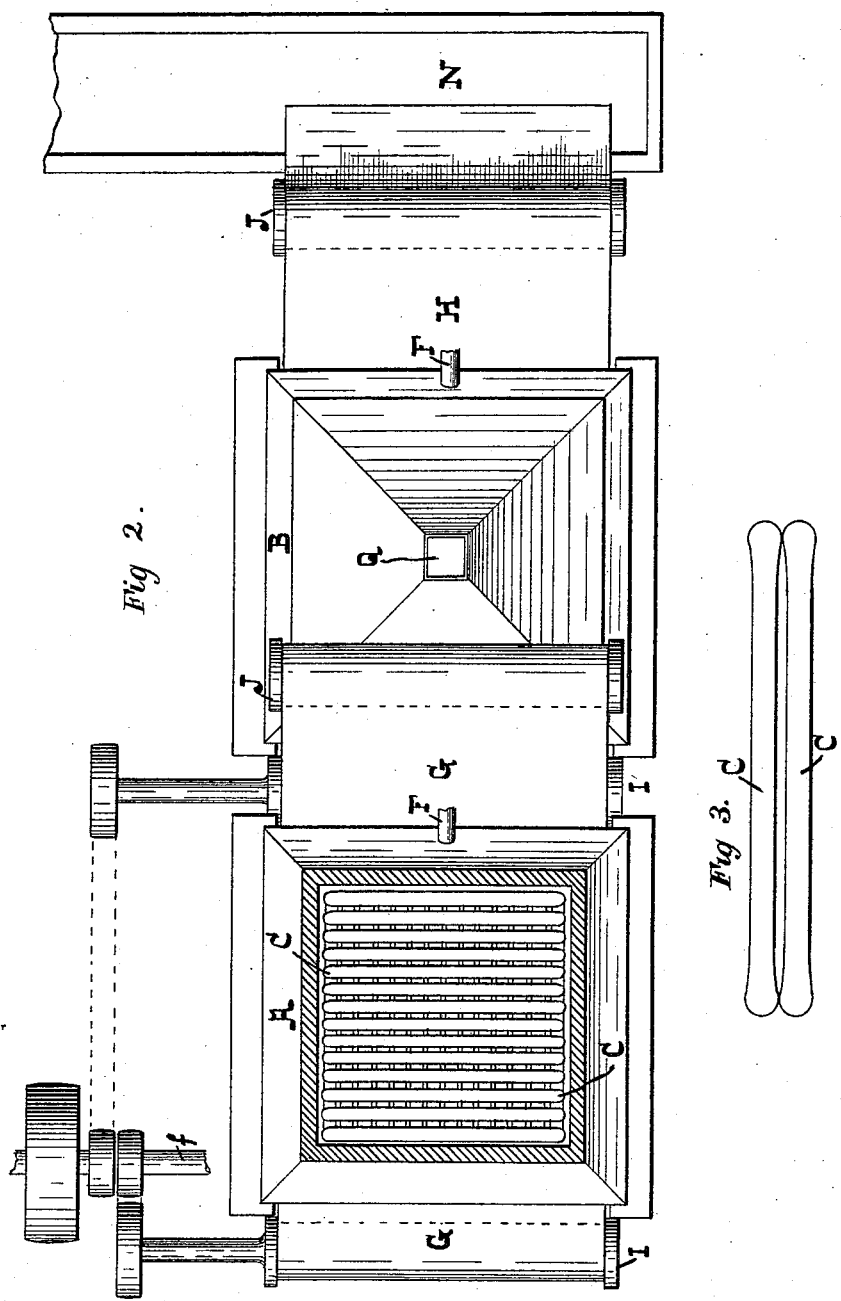
WITNESSES
Dan'l Fisher
H. C. Landis
INVENTOR
Samuel Wilkins Cragg,
by [signature], atty.

UNITED STATES PATENT OFFICE.

SAMUEL WILKINS CRAGG, OF BALTIMORE, MARYLAND.

LIXIVIATION PROCESS OF AND APPARATUS FOR THE EXTRACTION OF GOLD OR SILVER.

SPECIFICATION forming part of Letters Patent No. 449,814, dated April 7, 1891.

Application filed March 25, 1890. Serial No. 345,261. (No model.)

*To all whom it may concern:*

Be it known that I, SAMUEL WILKINS CRAGG, of the city of Baltimore, in the State of Maryland, have invented an Improved Lixiviation Process and Apparatus for the Extraction of Gold and Silver from Ores, as will hereinafter fully appear.

In the description of the said invention which follows reference is made to the accompanying drawings, forming a part hereof, and in which—

Figure 1 is a sectional elevation of the apparatus; and Fig. 2 a plan of the same, taken on the section-line $xx$. Fig. 3 is an enlarged view of two bars used in the apparatus.

In the said drawings, A represents a leaching-vat into which the pulp is first introduced, and B is a similar vat in which lixiviation is completed. These vats may be constructed of any suitable material and in any shape; but they are preferably made of California white cedar and of a rectangular cross-section, as shown in Fig. 2. A grating $a$, made of narrow strips of wood, which may be crossed, if desired, is placed in each of the vats near the top edge thereof, so as to form a shallow basin to prevent the overflow of the pulp. Underneath the grating are placed bars C, in rows, which are crossed and separated, and several of such rows form sections which are independently supported by rods D, fastened to the sides of the vat, and the lowest section by the base E, as shown in Fig. 1. The said bars may be made of any material which will not decompose chlorides of gold or silver, nor be injuriously acted upon by the solutions employed in the vats. They may have any shape of cross-section and be either solid or hollow. I prefer, however, to make them cylindrical in form and of dry white pine, and paint them with white lead or asphaltum varnish. The separation of the sections allows of a free circulation of air through and around the bars.

F is a pipe for the admission of air.

The vats rest on a frame-work, which also supports the filters G and H, which are placed under the vats. The said filters are composed of an endless-cloth apron stretched on horizontal revoluble rollers I and J, and tightening-rollers K. Underneath the filters are troughs L and M to receive the wash-waters and liquors; and suitable channels lead from the said troughs to precipitating-vats, (not shown,) where the said liquors and solutions are treated by well-known means to recover the precious metals.

N is a sluice into which the tailings are discharged.

The mixers O and P, in which the pulp is mixed with water or hyposulphite solutions, are placed over the vats, as shown. They each consist of a trough $b$ formed on the head of the vat, and pipes $c$ and $d$, which enter the trough from opposite ends, and terminate at the center. They are out of alignment, as shown in Fig. 1. These mixers are fully shown and described in applications of Joseph Cragg, Serial Nos. 336,146 and 336,147, to which reference should be made. In the center of the trough and directly over the point where the two pipes meet is a hopper Q.

Over the mixers and hoppers are placed hoods or chimneys to induce an upward current of air through the vats. Suitable doors (not shown) in the hoods give access to the hoppers.

The operation of treating ores in accordance with my invention is as follows: The gold and silver bearing ore is ground or pulverized to a finely-divided condition and subjected to a chloridizing roasting. It is then introduced into the hopper of the vat A, from which it passes to the trough O. On entering the said trough it is divided into two streams, one falling in front of each of the pipes $c$ and $d$. At the same time water is admitted into the trough from an elevated tank (not shown) through the said pipes, and the discharge meeting with the finely-ground ore carries it in opposite directions in the trough, as described in the said applications. The effect of these reverse currents is to thoroughly mix the ore and the water. The pulp thus formed overflows the sides of the trough or through the aperture $e$ and falls on the grating $a$ and passes through it into the interior of the vat in minute drops or thin streams, which, falling on the first or top row of bars, pass over their surfaces and drip onto the next row below, and so on, passing over all the bars of the section. It then falls through a current of atmospheric air circulating between the sections and strikes the first row of bars of the second section, and, passing over these bars, drips from one row to the next one below, and so on, from one section to the next one under it until it falls on the filter. The passage of the pulp over these round surfaces, which are separated from each other, greatly facilitates the breaking up of the chlorides and the salts of the base metals, as each particle of ore is successively immersed in several different drops or films of water, which insures that all the soluble material present will be dissolved in the water. All the globules of gas formed in the water are broken and all deleterious gases generated by the decomposition of the chlorides or salts of the base metals—such, for example, as sulphureted hydrogen — which would precipitate gold are diluted by the currents of air circulating in the vat and around and about the bars and carried off. The rollers or drums of both filters receive their motion from a shaft $f$ through the medium of suitable belts and pulleys. The pulp drips onto the endless cloth or apron G, which is carried forward by the horizontal rollers I, around which it is stretched. There is thus a continual renewal of the filtering surface under the vat, and as a very small quantity of pulp, not exceeding a sixteenth of an inch in thickness, is deposited at any one place on the cloth, the liquor is soon filtered and passes into the trough L. As the filter-cloth carrying the pulp passes out from under the vat A, the pulp may be sprayed with water to wash out any of the leaching-water or soluble salts remaining in it. This wash-water is also collected in the trough. As the apron G advances and passes over the roller L, the pulp falls or is scraped off into the hopper Q of the vat B, from which it passes through the mixer P into the second vat. On entering the trough $b$ of the second mixer P it is divided into two streams, one falling in front of each of the pulps, as before described. At this time a solution of sodium or calcium hyposulphite is admitted into the trough through the pipes $c$ and $d$ from an elevated tank (not shown) and meeting with the finely-ground ore carries it in opposite directions in the trough $b$. The effect of these reverse currents is to thoroughly mix the ore with the hyposulphite solution. The subsequent treatment of this pulp is the same as that already described in the leaching-vat, except that it is imperative to wash out of the pulp any of the solution remaining after the filter moves from under the lixiviation-vat by means of water as in the first operation. The tailings are then sluiced away.

During the lixiviation of gold and silver pulp containing base-metal salts, sulphureted hydrogen and other gases are generated. The removal of these deleterious gases is of great importance; but this cannot be accomplished advantageously in the vats of usual construction in which several tons of pulp are confined in one mass and the gases remain confined in the pulp for a long time, and thus precipitate the precious metal. Trough lixiviation exposes the surface of the wash-water or solutions to the atmospheric air, but the fine particles of ore float or are carried along the same envelope of water or solution, and the globules of gas formed by the decomposition of the chlorides and the salts of the base metals float on or in the current and are carried into the settling-tanks, where they act with great energy precipitating the precious metals. When sodium hyposulphite solutions are used, the removal of these gases by atmospheric air is absolutely necessary for complete success, as in order to form the hyposulphite double salts the precious metals have to become oxidized, the oxygen being derived from the air absorbed by the solution. Hence it is the quantity of free oxygen in the solution by which the result is, to a great extent, determined.

The absorption of oxygen by the solution is principally a function of time, temperature, and surface exposure, and the absence of other gases. By my improved process the said solution is divided into drops or thin films in a current of atmospheric air while in contact with the pulp. The deleterious gases are removed, and the oxygen of the solution used to oxidize the gold and silver is restored in the solution by the oxygen absorbed from the air present.

It is well known that a very small quantity of minute particles of the salts of base metals and finely-divided chlorides of gold and silver are almost instantly dissolved in water or in hyposulphite solutions. I accomplish this in the apparatus already described by separating the pulp into drops, which I filter in small quantities on a large surface. The lixiviation of the ore is thus accomplished in a continuous and rapid manner.

I claim as my invention—

1. The process of restoring the oxygen in a hyposulphite solution in the lixiviation process herein described, which consists in passing a current of air through the ore pulp while the said solution is in contact therewith, substantially as specified.

2. A lixiviation or a leaching vat having a grating at the top and a mixer over the said grating, combined with a system of crossed separated bars in independent sections, a pipe for the introduction of air, and a hood to carry off the air and gases, substantially as specified.

3. A leaching-vat, a grating at the top thereof through which ore pulp and water are introduced to the interior of the vat, and a system of crossed separated bars within the vat through which the ore pulp and water pass, combined with an endless-apron filter on which the ore pulp and water fall from the said crossed bars, a trough beneath the filter to receive the water, and a lixiviation-vat into which the apron-filter discharges the ore pulp, substantially as specified.

4. A leaching-vat, a grating at the top thereof through which ore pulp and water are introduced to the interior of the vat, and a system of crossed separated bars within the vat through which the ore pulp and water pass, combined with an endless-apron filter on which the ore pulp and water fall from the said crossed bars, a trough beneath the filter to receive the water, a lixiviation-vat into which the apron-filter discharges the ore pulp, and a device to spray water on the ore pulp on the apron-filter between the two vats, substantially as specified.

SAMUEL WILKINS CRAGG.

Witnesses:
 WM. T. HOWARD,
 DANL. FISHER.